J. P. JOHNSON.
LUBRICATOR.
APPLICATION FILED MAY 11, 1908.
904,962.
Patented Nov. 24, 1908.
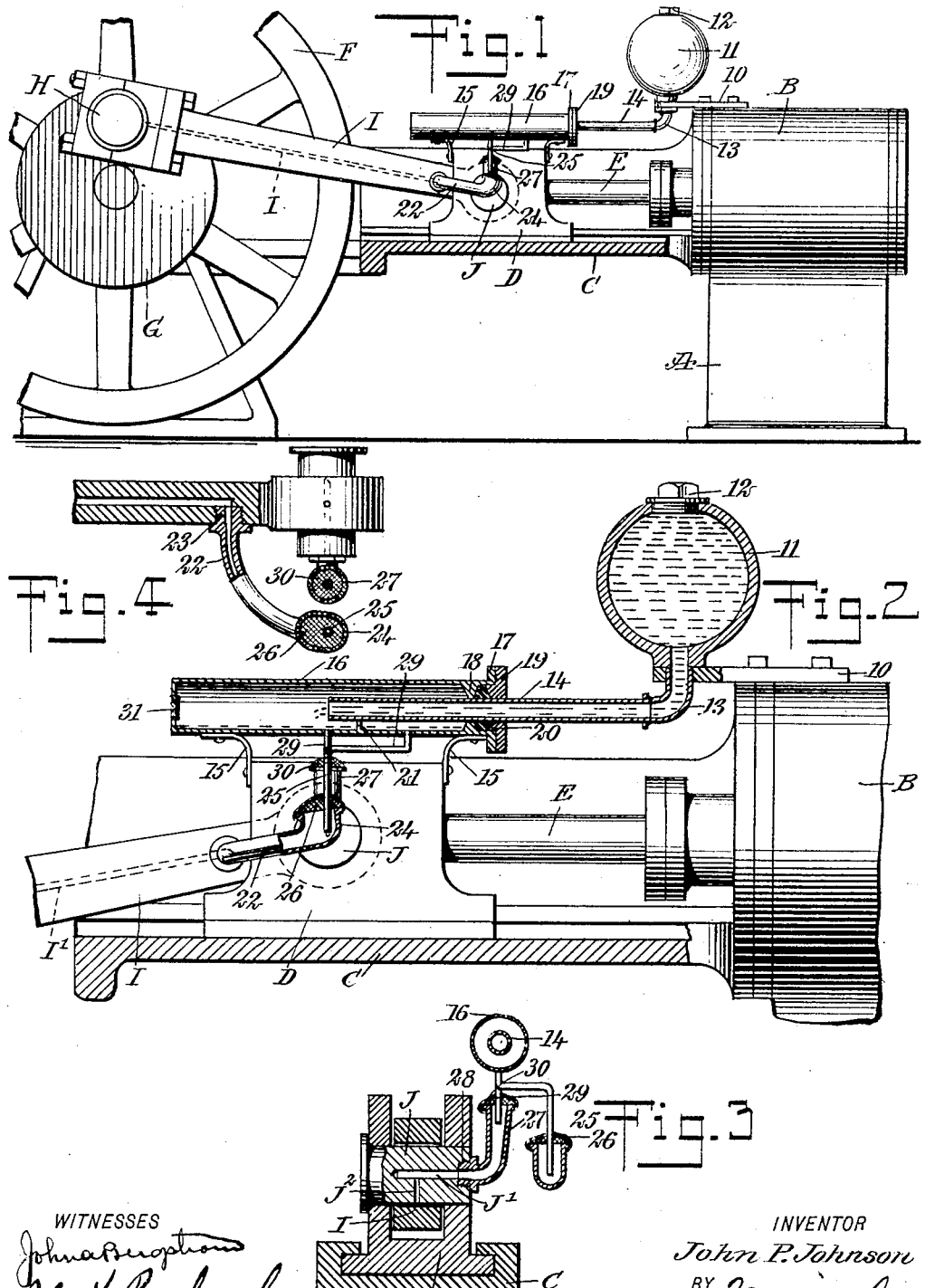
INVENTOR
John P. Johnson

UNITED STATES PATENT OFFICE.

JOHN P. JOHNSON, OF ABERCROMBIE, NORTH DAKOTA.

LUBRICATOR.

No. 904,962.  Specification of Letters Patent.  Patented Nov. 24, 1908.

Application filed May 11, 1908. Serial No. 432,006.

*To all whom it may concern:*

Be it known that I, JOHN P. JOHNSON, a citizen of the United States, and a resident of Abercrombie, in the county of Richland and State of North Dakota, have invented a new and Improved Lubricator, of which the following is a full, clear, and exact description.

This invention relates to lubricators, and more particularly to lubricators for oiling moving bearings of steam engines and similar machines, and drawing the oil from stationary reservoirs.

More specifically, the invention relates to a lubricator comprising a stationary oil reservoir or tank, and an oil receiver mounted upon a cross-head and movable therewith and having a sliding dust-proof connection with the feed pipe of the reservoir, the receiver consisting of compartments of unequal size, which, as the cross-head moves back and forth, receive different quantities of oil, and means for conducting the oil from the compartments to the cross-head and crank bearings of the engine.

An object of the invention is to provide a simple, inexpensive and durable lubricator by means of which moving bearings can be continuously supplied with oil from a stationary reservoir, which is so constructed that it is impossible for dust or other foreign matter to become mixed with the oil being fed to the bearings, and by means of which the different bearings can be simultaneously supplied with different quantities of oil in accordance with their requirements.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side view of a horizontal steam engine, showing a cross-head guide in longitudinal section and having my invention applied thereto; Fig. 2 is an enlarged longitudinal section of the lubricator as applied to the cross-head of an engine; Fig. 3 is an enlarged transverse section of the cross-head of the engine, showing the lubricator in transverse section; and Fig. 4 is a longitudinal section of the cross-head end of the connecting rod.

Referring more particularly to the drawings, A represents the base of a horizontal steam engine having a cylinder B, a cross-head guide C, upon which the cross-head D is arranged to reciprocate, and which is connected in the usual manner with the piston rod E. The fly-wheel F has a crank disk G provided with the usual crank or wrist-pin H. A connecting rod I is mounted upon the crank-pin H in the customary manner and at the end remote from the crank-pin is mounted upon the cross-head pin J, being positioned between the sides of the cross-head, as is shown most clearly in Fig. 3. While in the accompanying drawings I have shown an ordinary steam engine as an example of the type to which my invention is applicable, I wish to emphasize that the same can be advantageously used with other kinds of engines as well. The lubricator can be employed for supplying oil to moving bearings other than the crank and cross-head bearings of an engine, and it can be applied to any reciprocating engine for this purpose.

A bracket 10 is bolted or otherwise secured to the cylinder of the engine and carries an oil reservoir or tank 11 which may be of any preferred or common form. As shown for example, it is spherical and has a cap or closure 12. An outlet 13 is provided at the bottom of the reservoir and extends through a suitable opening of the bracket 10. A substantially horizontal and laterally extended feed pipe 14 is joined to the outlet pipe 13. At the opposite ends, the cross-head D carries the angular supports 15 upon which is mounted an oil receiver 16. The latter is of a substantially cylindrical form and is arranged horizontally to receive the feed pipe 14. At the end adjacent to the feed pipe, the receiver has a lateral flange 17 and at the end an annular rib 18. A head 19 together with a suitable packing 20, serves to form with the rib 18 and the flange 17, a dust-proof stuffing-box through which the feed pipe passes. As the cross-head D moves back and forth, the receiver 16 is correspondingly actuated and moves back and forth with respect to the feed pipe. At the bottom, the receiver has a partition 21 dividing it into compartments of unequal sizes, which receive different quantities of oil as the receiver is reciprocated. It will be understood that if a lubricator is desired which does not have to be dust-proof, the cylindrical or closed receiver can be replaced by an open trough or shell.

In the form of the invention shown in the drawings, the connecting rod I has a longitudinal bore I' leading to the crank pin bearing and serving to conduct oil thereto. At the end adjacent to the cross-head, a pipe 22 has a threaded end 23 mounted in a suitable opening of the connecting rod and communicates with the passage I'. At the free end, the pipe 22 is formed into a cup 24 into which projects a discharge pipe 25 leading from one of the compartments of the receiver. A cover 26 of fabric or other flexible material is mounted at the rim of the cup and encompasses the discharge pipe 25, so that a flexible dust-proof connection is formed. It will be understood that the cup is of such size that the movement of the connecting rod does not cause the discharge pipe 25 to interfere with the cup. If so desired, the bore or passage I' of the connecting rod can be replaced by a tube arranged longitudinally of the connecting rod, or by some similar arrangement.

The cross-head pin J has a substantially central bore J' having a branch J² and serving to conduct oil to the bearing. A discharge pipe 27 having a threaded end 28 mounted in a correspondingly threaded opening at the end of the cross-head pin communicates with the bore I' and constitutes a cup. A discharge pipe 29 leading from the other compartment of the receiver projects into the cup. A flexible dust-proof cover 30 is mounted upon the rim of the cover 27 and encompasses the discharge pipe 29 to form a flexible dust-proof connection.

If desired, the receiver may have other compartments, and means may be provided for conducting the oil from these other compartments to various other bearings. Preferably it has an opening 31 covered with a dust sieve or strainer, to prevent a pump-like action, when the receiver is in operation with the cross-head.

In the engine shown in the drawings, a single cross-head guide only is employed. As the oil receiver is mounted to extend at one side of the cross-head it will not interfere with the cross-head guides when two— that is, when an upper and a lower one—are employed. If a lower guide only is used, the receiver can, of course, be mounted on top of the cross-head for convenience.

Having thus described my invention, I claim as new and desire to secure by Letters Patent:

1. The combination, with an engine having a crank, a cross-head and a connecting rod joining said crank and said cross-head, of a stationary reservoir, a receiver mounted upon said cross head and having a sliding connection with said reservoir in the direction of movement of said cross head, and means for conducting oil from said receiver to the bearings of said crank and said cross-head.

2. The combination, with an engine having a crank, a cross head, and a connecting rod joining said crank and said cross-head, of a stationary reservoir, a receiver mounted upon said cross head, said reservoir being provided with a feed pipe extending into said receiver and arranged longitudinally of said cross head and having a sliding connection therewith, said crank and said cross-head having oil ducts leading to the bearings of the same, and outlet pipes from said receiver to said ducts and discharging at all times at said ducts, said outlet pipes and said ducts being free to move relatively to one another.

3. The combination, with an engine having a crank, a cross head, and a connecting rod joining said crank and said cross head, of a stationary reservoir having a laterally extending feed pipe, a receiver mounted upon said cross head and having said feed pipe extending into it, said receiver having a stuffing box permitting the passage therethrough of said feed pipe, said connecting rod and said cross head having oil ducts to the bearings thereof, pipes communicating with said ducts and having cups, discharge pipes leading from said receiver and projecting into said cups, and flexible covers upon said cups encompassing said discharge pipes.

4. The combination with an engine having a crank, a cross head, and a connecting rod joining said crank and said cross head, of a stationary reservoir having an inlet, a receiver mounted upon said cross head and having a sliding connection with said reservoir in the direction of movement of said cross head, said receiver comprising compartments of unequal sizes, said receiver being arranged to receive oil at all points of its movement, from said outlet, and means for conducting oil from said compartments of said receiver to the bearings of said crank and said cross head.

In testimony whereof I have signed my name to this specification in the presence of two subscribing witnesses.

JOHN P. JOHNSON

Witnesses:
O. E. OLSON,
H. J. HAGEN.